United States Patent
Nakata et al.

(10) Patent No.: US 8,100,112 B2
(45) Date of Patent: Jan. 24, 2012

(54) FUEL-SUPPLY QUANTITY ESTIMATING APPARATUS AND FUEL INJECTION SYSTEM

(75) Inventors: Kenichiro Nakata, Anjo (JP); Koji Ishizuka, Chita-gun (JP)

(73) Assignee: Denso Corporation, Kariya (JP)

( * ) Notice: Subject to any disclaimer, the term of this patent is extended or adjusted under 35 U.S.C. 154(b) by 718 days.

(21) Appl. No.: 12/235,917

(22) Filed: Sep. 23, 2008

(65) Prior Publication Data

US 2009/0084357 A1  Apr. 2, 2009

(30) Foreign Application Priority Data

Sep. 28, 2007 (JP) ................................. 2007-255355

(51) Int. Cl.
*F02D 41/30* (2006.01)
(52) U.S. Cl. .................... 123/458; 123/495; 701/104
(58) Field of Classification Search .............. 123/305, 123/436, 446, 456, 458, 468–480, 495; 701/103–105, 114, 115
See application file for complete search history.

(56) References Cited

U.S. PATENT DOCUMENTS

| | | | | |
|---|---|---|---|---|
| 5,485,820 | A * | 1/1996 | Iwaszkiewicz | 123/458 |
| 5,535,621 | A * | 7/1996 | Glidewell et al. | 73/114.49 |
| 6,076,504 | A * | 6/2000 | Stavnheim et al. | 123/447 |
| 6,142,121 | A | 11/2000 | Nishimura et al. | |
| 7,558,665 | B1 * | 7/2009 | Geveci et al. | 701/104 |
| 7,637,247 | B2 * | 12/2009 | Kaneko et al. | 123/406.29 |
| 7,788,015 | B2 * | 8/2010 | Geveci et al. | 701/103 |
| 7,810,472 | B2 * | 10/2010 | Kondo et al. | 123/456 |
| 7,945,372 | B2 * | 5/2011 | Geveci et al. | 701/103 |
| 2003/0233998 | A1 * | 12/2003 | Futonagane et al. | 123/299 |
| 2005/0092301 | A1 | 5/2005 | Fukuda | |
| 2005/0103311 | A1 * | 5/2005 | Adachi et al. | 123/456 |
| 2008/0228374 | A1 * | 9/2008 | Ishizuka et al. | 701/103 |
| 2009/0084357 | A1 * | 4/2009 | Nakata et al. | 123/458 |

FOREIGN PATENT DOCUMENTS

| | | |
|---|---|---|
| DE | 10 2005 042 140 | 4/2006 |
| DE | 10 2006 000 321 | 1/2007 |
| JP | 06-280717 | 10/1994 |
| JP | 2000-018064 | 1/2000 |
| JP | 2003-314331 | 11/2003 |
| JP | 2003-328812 | 11/2003 |

(Continued)

OTHER PUBLICATIONS

Chinese Office Action dated Feb. 23, 2011, issued in corresponding Chinese Application No. 200810161760.5, with English translation.

(Continued)

*Primary Examiner* — John T. Kwon
*Assistant Examiner* — Johnny Hoang
(74) *Attorney, Agent, or Firm* — Nixon & Vanderhye P.C.

(57) ABSTRACT

A variation waveform of fuel pressure is obtained by use of a fuel pressure sensor which detects pressure of fuel supplied to an injector. A quantity of fuel supplied to the injector is estimated based on a waveform of the detected pressure that is greater than a reference value due to a fuel pumping, in the obtained variation waveform. Especially, in a case that the fuel pressure sensor is provided to each of a plurality of injectors, it is desirable to obtain the variation waveform based on the output of the fuel pressure sensor provided to a cylinder in which no fuel injection is currently performed.

7 Claims, 8 Drawing Sheets

FOREIGN PATENT DOCUMENTS

JP    2006-070882    3/2006

OTHER PUBLICATIONS

U.S. Appl. No. 11/930,668 of Ishizuka, filed Oct. 31, 2007.
U.S. Appl. No. 12/179,235 of Ishizuka, filed Jul. 24, 2008.
U.S. Appl. No. 12/186,038 of Nakata, filed Aug. 5, 2008.
U.S. Appl. No. 12/187,638 of Nakata, filed Aug. 7, 2008.
U.S. Appl. No. 12/189,376 of Nakata, filed Aug. 11, 2008.
U.S. Appl. No. 12/194,917 of Nakata filed Aug. 20, 2008.
U.S. Appl. No. 12/195,609 of Nakata filed Aug. 21, 2008.
U.S. Appl. No. 12/194,130 of Nakata filed Aug. 19, 2008.
U.S. Appl. No. 12/197,447 of Nakata filed Aug. 25, 2008.
U.S. Appl. No. 12/201,426 of Nakata filed Aug. 29, 2008.
U.S. Appl. No. 12/210,409 of Nakata filed Sep. 15, 2008.
U.S. Appl. No. 12/210,440 of Nakata filed Sep. 15, 2008.
U.S. Appl. No. 12/233,800 of Nakata filed Sep. 19, 2008.
Japanese Office Action dated Aug. 28, 2009, issued in corresponding Japanese Application No. 2007-255355, with English translation.
U.S. Appl. No. 12/236,882, Koji Ishizuka et al., filed Sep. 24, 2008.
U.S. Appl. No. 12/255,936, Koji Ishizuka et al., filed Oct. 22, 2008.
U.S. Appl. No. 12/256,100, Koji Ishizuka et al., filed Oct. 22, 2008.
U.S. Appl. No. 12/258,726, Koji Ishizuka et al., filed Oct. 27, 2008.
U.S. Appl. No. 12/258,750, Koji Ishizuka et al., filed Oct. 27, 2008.

* cited by examiner

INJECTION COMMAND SIGNAL

INJECTION RATE

INLET PRESSURE OF INJECTION CYLINDER

INLET PRESSURE OF NO-INJECTION CYLINDER

PUMPING COMPONENT

DETECTED PRESSURE

FIRST-ORDER DIFFERENTIAL VALUE

INJECTION COMMAND SIGNAL

INJECTION RATE

INLET PRESSURE OF INJECTION CYLINDER

INLET PRESSURE OF NO-INJECTION CYLINDER

PUMPING COMPONENT

FUEL-SUPPLY QUANTITY ESTIMATING APPARATUS AND FUEL INJECTION SYSTEM

CROSS-REFERENCE TO RELATED APPLICATION

This application is based on Japanese Patent Application No. 2007-255355 filed on Sep. 28, 2007, the disclosure of which is incorporated herein by reference.

FIELD OF THE INVENTION

The present invention relates to a fuel-supply quantity estimating apparatus which can estimate fuel quantity supplied to a fuel injector, and a fuel injection system equipped with the same.

BACKGROUND OF THE INVENTION

JP-10-220272A (U.S. Pat. No. 6,142,121) shows a fuel injection system in which a fuel pump supplies fuel to a fuel injector which injects fuel into a cylinder of an internal combustion engine. This fuel injection system is provided with a fuel pressure sensor. The fuel pressure sensor is arranged in a common-rail to detect fuel pressure supplied to the injector. Each control unit configuring the fuel injection system, such as the fuel pump, a pressure reducing valve and the like, is feedback controlled so that the detected fuel pressure comes close to a target fuel pressure.

According to the inventors' knowledge, a fuel-supply quantity that is actually supplied to the fuel injector is an important parameter to control the fuel injection system with high accuracy. For example, an operation command value of the control unit is computed or corrected based on the fuel-supply quantity, so that each control unit can be accurately controlled.

Although JP-10-220272A describes the feedback control, it is silent about the above inventors' knowledge. That is, JP-10-220272A fails to show a configuration to detect the fuel-supply quantity.

SUMMARY OF THE INVENTION

The present invention is made in view of the above matters, and it is an object of the present invention to provide a fuel-supply quantity estimating apparatus which can estimate fuel quantity supplied to a fuel injector, whereby a control accuracy of the fuel injection system is improved.

According to the present invention, a fuel-supply quantity estimating apparatus is applied to a fuel injection system including a fuel pump, a fuel injector, and a fuel pressure sensor detecting pressure of fuel supplied to the fuel injector. The fuel-supply quantity estimating apparatus includes: a waveform obtaining means for obtaining a variation waveform of the pressure detected by the fuel pressure sensor; and an estimating means for estimating a quantity of fuel supplied to the fuel injector based on a waveform of the detected pressure that is greater than a reference value due to a fuel pumping, in the variation waveform obtained by the waveform obtaining means.

The inventors of the present invention recognizes that a variation waveform of the pressure detected by the fuel sensor increases with respect to a reference pressure along with a fuel pumping by the fuel pump. Furthermore, the increasing quantity corresponds to a fuel-supply quantity. According to the present invention, the variation waveform of the detected pressure is obtained, and the fuel-supply quantity is estimated based on a waveform (L1, L3 in FIG. 8) of which detected pressure is greater than the reference pressure (L2, L4 in FIG. 8, L5 in FIG. 9). Therefore, the fuel-supply quantity is accurately estimated, whereby the fuel injection can be controlled with high accuracy.

In a case that a plurality of the fuel injectors are provided, the fuel-supply quantity is a total quantity supplied to every fuel injectors.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

Figure 1:
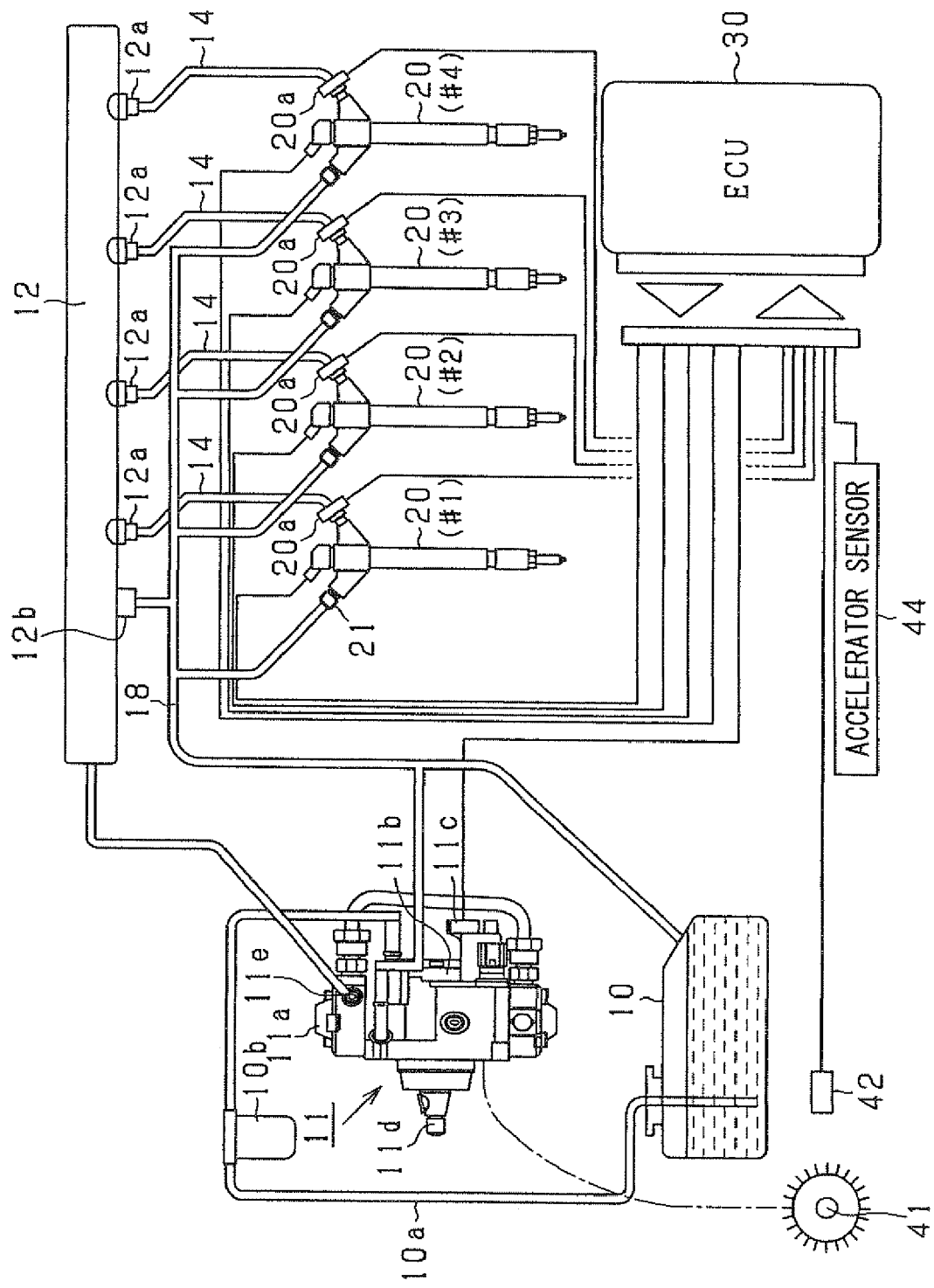
FIG. 1 is a construction diagram showing an outline of a fuel injection system control apparatus according to a first embodiment of the present invention.

Hereinafter, embodiments of the present invention will be described with reference to the drawings. In each embodiment, a controller is mounted on a common-rail type fuel injection system applied to an internal combustion engine. The engine is a diesel engine. High pressure fuel (for example, light oil of 1000 atmospheres or more) is directly injected into a combustion chamber of the diesel engine.

First Embodiment

The outline of the common-rail type fuel injection system according to this embodiment will be described with reference to FIG. 1. A multi-cylinder engine (for example, inline four-cylinder engine) for a four-wheel automobile is assumed as the engine of this embodiment. More specifically, the engine is a four-stoke reciprocal diesel engine. In this engine, an object cylinder is successively distinguished by a cylinder discrimination sensor (electromagnetic pickup) provided in camshafts of the intake-exhaust valves. That is, one combustion cycle including 4 strokes of intake, compression, power, and exhaust is performed in sequence at a cycle of "720° CA" with respect to each of four cylinders #1-#4. The combustion is performed in the cylinder#1, #3, #4, and #2 in this series with a deviation of 180° CA. The fuel injectors 20 in the FIG. 1 are provided for cylinders #1, #2, #3, and #4.

The various devices constructing the fuel supply system include a fuel tank 10, a fuel pump 11, a common-rail 12, and injectors 20 which are arranged in this order from the upstream side of fuel flow. The fuel tank 10 and the fuel pump 11 are connected to each other by piping 10a via a fuel filter 10b. The fuel tank 10 is a tank (container) for storing the fuel (light oil) of an engine.

As shown in FIG. 1, this system is constructed in such a way that an electronic control unit (ECU) 30 receives sensor outputs (detection results) from various sensors and controls the driving of a fuel supply apparatus, such as injectors 20 and the fuel pump 11, on the basis of these respective sensor outputs.

The fuel pump 11 includes a high-pressure pump 11a and a low-pressure pump 11b and is constructed in such a way that the fuel suctioned from the fuel tank 10 by the low-pressure pump 11b is pressurized and discharged by the high-pressure pump 11a. The quantity of fuel pressure-fed to the high-pressure pump 11a, that is, the quantity of fuel discharged by the fuel pump 11 is controlled by a suction control valve (SCV) 11c disposed on the fuel suction side of the fuel pump 11. In other words, the driving current of the SCV 11c is adjusted to control the quantity of discharge of the fuel from the fuel pump 11 to a desired value. The SCV 11c is a normally open valve that is opened when the current is not passed.

The low-pressure pump 11a is constructed, for example, as a trochoidal feed pump. The high-pressure pump 11a is constructed, for example, of a plunger pump and is constructed in such a way that a specified number of plungers (for example, 3 plungers) are reciprocated respectively in an axial direction by an eccentric cam (not shown) to pump the fuel in a pressuring chamber at specified timing sequentially. Both pumps are driven by a drive shaft 11d. The drive shaft 11d is rotated in association with a crankshaft 41 of the engine and is rotated, for example, at a ratio of 1/1 or 1/2 with respect to one rotation of the crankshaft 41. That is, the low-pressure pump 11b and the high-pressure pump 11a are driven by the output of the engine.

The fuel in the fuel tank 10 is suctioned by the fuel pump 11 via a fuel filter 10b and is pressurized and pumped (pressure-fed) to the common-rail 12 through a piping. The common-rail 12 stores the fuel in a high pressure state, and performs a fuel distribution to the injector 20 of each cylinder #1-#4 through the high pressure piping 14 respectively. A fuel exhaust port 21 of each injector 20 (#1-#4) is connected to a piping 18 for returning excessive fuel to the fuel tank 10. Moreover, between the common-rail 12 and the high pressure piping 14, there is provided an orifice 12a (fuel pulsation reducing means) which attenuates pressure pulsation of the fuel which flows into the high pressure piping 14 from the common-rail 12.

The common-rail 12 is provided with a pressure reducing valve 12b. When it is controlled so that the pressure reducing valve 12b is opened by the ECU30, a part of fuel in the common-rail 12 is returned to the fuel tank 10 through the piping 18, Therefore, the fuel pressure in the common-rail 12 is decreased. Alternatively, the injector may perform no-injection operation to reduce the pressure in the common-rail 12 without providing the pressure reducing valve 12b. In the no-injection operation, the solenoid 20b is energized for a short period and the fuel is returned to the fuel tank 10 through the fuel discharge port 21 without performing the fuel injection from the injection port 20f.

Figure 2:
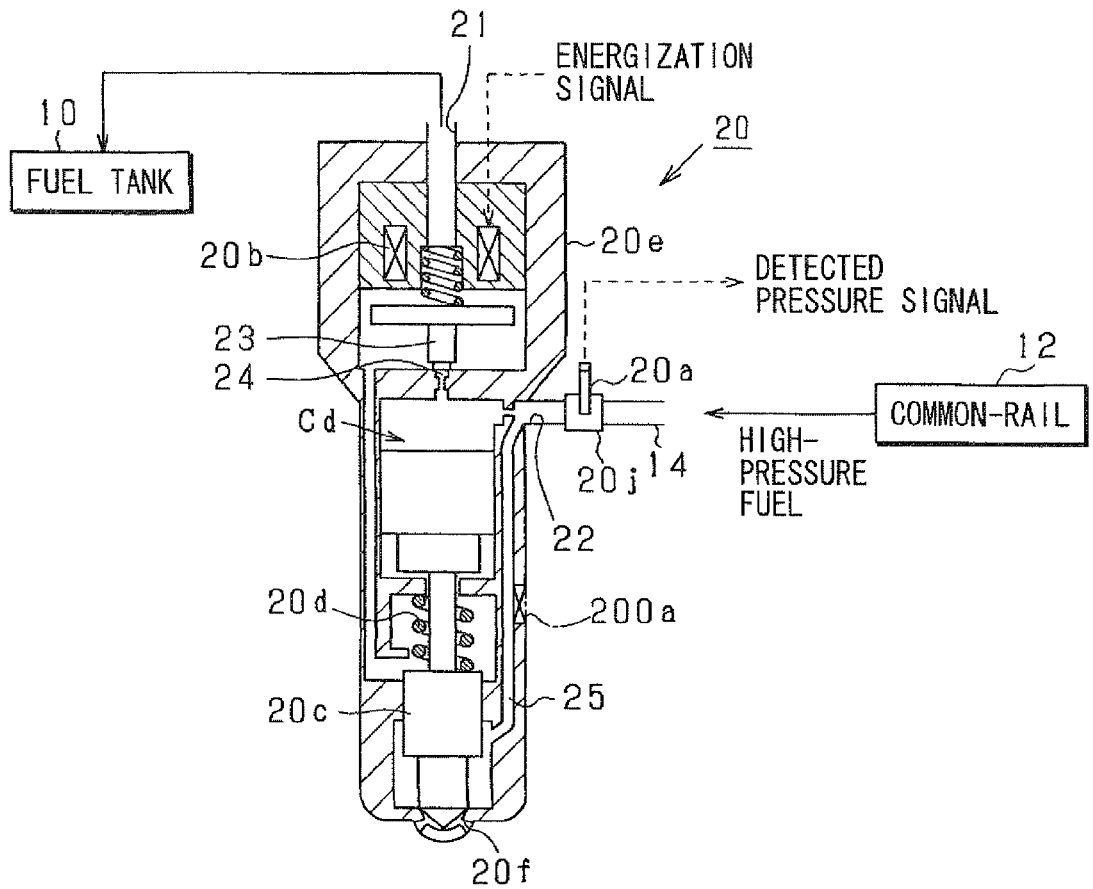
FIG. 2 is an internal side view schematically showing an internal structure of an injector.

The structure of the injector 20 will be described in detail with reference to FIG. 2. The above four injectors 20(#1-#4) have fundamentally same structure. The injector 20 is an injector of the oil-pressure drive type using the fuel for combustion (fuel in the fuel tank 10), and a driving force for fuel injection is transferred to the valve portion through an oil pressure chamber (control chamber) Cd. As shown in FIG. 2, the injector 20 is a normally-closed valve.

A housing 20e of the injector 20 has a fuel inlet 22 through which the fuel flows from the common-rail 12. A part of the fuel flows into the oil pressure chamber Cd and the other flows toward the fuel injection port 20f through the fuel inlet 22. The oil pressure chamber Cd is provided with a leak hole 24 which is opened/closed by a control valve 23. When the leak hole 24 is opened, the fuel in the oil pressure chamber Cd is returned to the fuel tank 10 through the leak hole 24 and a fuel discharge port 21.

When a solenoid 20b is energized, the control valve 23 is lifted up to open the leak hole 24. When the solenoid 20b is deenergized, the control valve 23 is lifted down to close the leak hole 24. According to the energization/deenergization of the solenoid 20b, the pressure in the oil pressure chamber Cd is controlled. The pressure in the oil pressure chamber Cd corresponds to a back pressure of the needle valve 20c. A needle valve 20c is lifted up or lifted down according to the pressure in the oil pressure chamber Cd, receiving a biasing force from a spring 20d. When the needle valve 20c is lifted up, the fuel flows through the fuel supply passage 25 and is injected into the combustion chamber through the injection port 20f.

The needle valve 20c is driven by an ON-OFF control. That is, the solenoid 20b receives a pulse signal from the ECU 30 to drive the needle valve 20c. When the solenoid 20b receives ON signal, the needle valve 20c is lifted up to open the injection port 20f. When the solenoid 20b receives OFF signal, the needle valve 20c is lifted down to close the injection port 20f.

The pressure in the oil pressure chamber Cd is increased by supplying the fuel in the common-rail 12. On the other hand, the pressure in the oil pressure chamber Cd is decreased by energizing the solenoid 20b to lift up the control valve 23 so that the leak hole 24 is opened. Thereby, the fuel in the oil pressure chamber Cd is returned to the fuel tank 10 through the piping 18 which connects the injector 20 with the fuel tank 10. That is, the fuel pressure in the oil pressure chamber Cd adjusted by the control valve 23 controls the operation of the needle valve 20c which opens/closes the fuel injection port 20f.

As described above, the injector 20 is provided with a needle valve 20c which opens/closes the injector 20. When the solenoid 20b is deenergized, the needle valve 20c is moved to a closed-position by a biasing force of the spring 20d. When the solenoid 20b is energized, the needle valve is moved to an open-position against the biasing force of the spring 20d. The lift amount of the needle valve 20c is symmetrically varied in opening direction and closing direction.

A fuel pressure sensor 20a is disposed at a vicinity of the fuel inlet 22. Specifically, the fuel inlet 22 and the high pressure piping 14 are connected with each other by a connector 20j in which the fuel pressure sensor 20a is disposed.

The fuel pressure sensor 20a detects fuel pressure at the fuel inlet 22 at any time. Specifically, the fuel pressure sensor 20a can detect a variation pattern of the fuel pressure due to the fuel injection, a fuel pressure level (stable pressure), a fuel injection pressure, and the like.

The fuel pressure sensor 20a is provided to each of the injectors 20 (#1-#4). Based on the outputs of the fuel pressure sensor 20a, the variation pattern of the fuel pressure due to the fuel injection can be detected with high accuracy.

The vehicle (not shown) is provided with various sensors for vehicle control. For example, a crankshaft 41 that is the output shaft of the engine is provided with a crank angle sensor 42 (for example, an electromagnetic pick-up) for outputting a crank angle signal at intervals of a specified crank angle (for example, at intervals of 30° CA) so as to detect the rotational angle position and the rotation speed of the crankshaft 41. An accelerator pedal (not shown) is provided with an accelerator sensor 44 for outputting an electric signal according to the state (quantity of displacement) of the accelerator pedal so as to detect the quantity of operation of the accelerator pedal (stepped amount of the accelerator) by a driver.

The ECU 30 performs the engine control in this system. The ECU 30 is constructed of a well-known microcomputer (not shown). The ECU 30 detects the operating state of the engine and user's request on the basis of the detection signal of various sensors and operates various actuators such as the injector 20 and the SCV 11c.

A microcomputer of the ECU 30 includes a central processing unit (CPU), a random access memory (RAM), a read only memory (ROM), an electrically erasable programmable read-only memory (EEPROM), a backup RAM, and the like. The ROM stores a various kind of programs for controlling the engine, and the EEPROM stores a various kind of data such as design date of the engine.

The ECU 30 computes a torque (required torque) which should be generated on an output shaft (a crank shaft 41) and a fuel injection quantity to obtain the required torque based on the outputs from the sensors. The fuel injection quantity is controlled so that an axial torque (output torque) which is actually generated on the crank shaft 41 agrees with the required torque.

That is, the ECU 30 computes the fuel injection quantity according to an engine driving condition and the accelerator operation amount. The ECU 30 outputs a fuel injection control signal to the injector 20. Hence, the output torque of the engine is brought to the target torque.

Besides, in the diesel engine of steady operation, the intake throttle valve is held at the approximate full open state in order to increase fresh air quantity and reduce pumping loss. Thus, the fuel injection quantity control is mainly performed.

Hereinafter, the basic procedure of the fuel injection control according to this embodiment will be described with reference to FIGS. 3-7. The values of various parameters used in these processings shown in FIGS. 3-6 are stored in the storage devices such as the RAM, the EEPROM, or the backup RAM mounted in the ECU 30 and are updated at any time as required. The processings are performed based on programs stored in the ROM.

Figure 3:
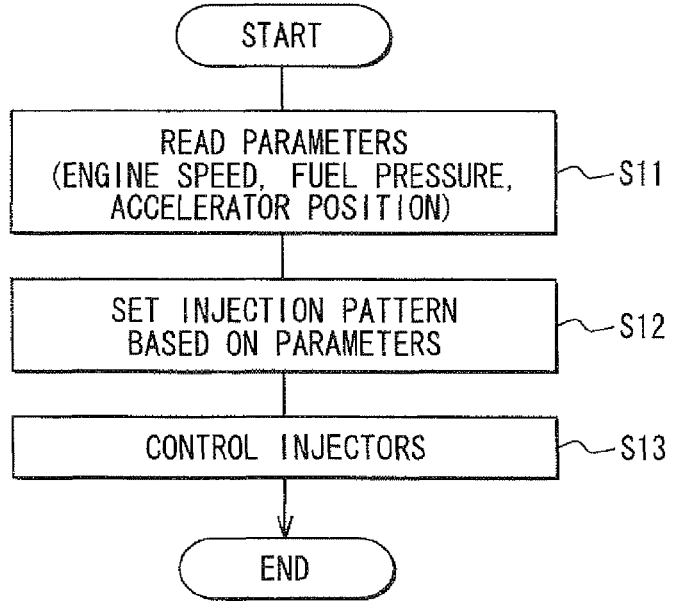
FIG. 3 is a flowchart showing a basic procedure of a fuel injection control according to the first embodiment.

The processing shown in FIG. 3 is performed once per one combustion cycle with respect to each cylinder. In step S11, the computer reads specified parameters, such as the engine speed measured by the crank angle sensor 42, the fuel pressure detected by the fuel pressure sensor 20a, and the accelerator position detected by the accelerator sensor 44.

In step S12, the computer sets the injection pattern based on the parameters which are read in step S11. In a case of a single injection, a target fuel injection quantity (target fuel injection time) is determined to generate the required torque on the crankshaft 41. In a case of a multi-injection, a target total fuel injection quantity (target fuel injection time) is determined to generate the required torque. Based on the injection pattern, a command value (command signal) to the injector 20 is determined. Thereby, a pilot-injection, a pre-injection, an after-injection, and a post-injection are conducted as well as the main-injection according to the driving condition of the vehicle.

The injection pattern is obtained based on a specified map and a correction coefficient stored in the ROM. Specifically, an optimum injection pattern is obtained by an experiment with respect to a range in which the specified parameters are assumed. The optimum injection pattern is stored in an injection control map. The injection pattern is determined by parameters such as a number of fuel injection per one combustion cycle, a fuel injection timing and fuel injection period of each fuel injection. The injection control map indicates a relationship between the parameters and the optimum injection pattern.

The injection pattern is corrected by the correction coefficient which is updated and stored in the EEPROM, and then the injection pattern and the command signal to the injector are obtained. The correction coefficient is sequentially updated during the engine operation.

The injection pattern may be determined based on maps which are independently formed with respect to each element of the injection pattern (for example, the number of fuel injection). Alternatively, the injection pattern may be determined based on a map which is formed with respect to some elements.

Then, the procedure proceeds to step S13. In step S13, the injector 20 is controlled based on the command value (command signal). Then, the procedure is terminated.

Figure 4:
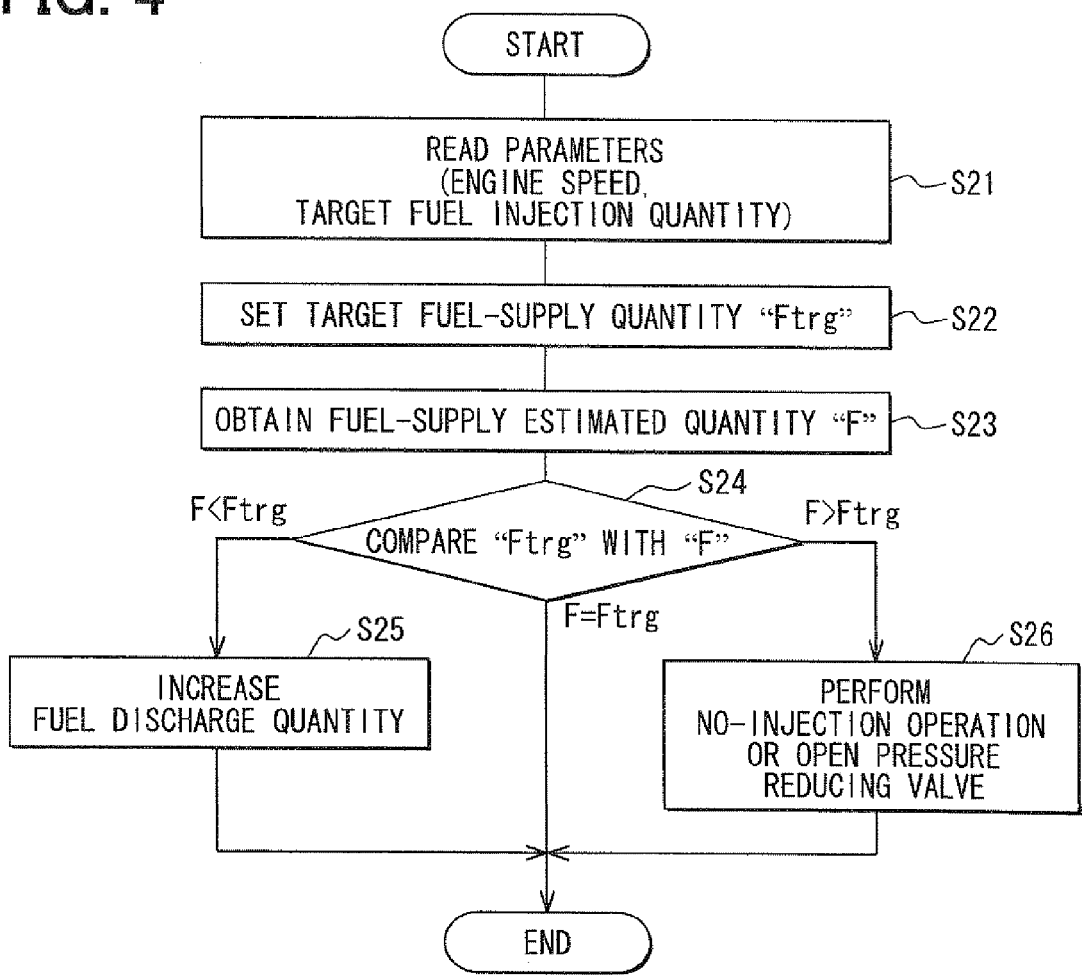
FIG. 4 is a flowchart showing a procedure of a fuel-supply quantity control according to the first embodiment.

The processing shown in FIG. 4 is performed at a specified cycle (for example, a computation cycle of the CPU) or at a every specified crank angle. In the processing, the fuel pump 11 is feedback controlled in such a manner that the fuel quantity supplied to the injector 20 agrees with the target fuel quantity. Besides, in this embodiment, the fuel quantity is a parameter which is feedback controlled. Alternatively, the fuel pressure (inlet pressure) can be a parameter which is feedback controlled. The fuel pump 11 can be feedback controlled so that the fuel pressure detected by the fuel pressure sensor 20a agrees with a target value (pressure command value).

In step S21, the computer reads specified parameters, such as the engine speed measured by the crank angle sensor 42, and the target fuel injection quantity (or target total fuel injection quantity) computed in step S12. In step S22, the computer sets a target fuel-supply quantity Ftrg based on the parameters which are read in step S21. For example, the target fuel-supply quantity Ftrg is obtained based on the engine speed and the target fuel injection quantity by use of a specified map stored in the ROM. Specifically, an optimum fuel-supply quantity is obtained by an experiment with respect to a range in which the specified parameters (step S21) are assumed. The optimum fuel-supply quantity is stored in a fuel-supply quantity control map. The fuel-supply quantity control map indicates a relationship between the parameters and the optimum fuel-supply quantity.

In step S23, a total quantity of the fuel supplied to a plurality of injectors 20 is estimated. This estimated total quantity of the fuel is referred to as a total fuel-supply estimated quantity F, hereinafter. This total fuel-supply estimated quantity F is a value computed by processings shown in FIGS. 5 to 9, which will be described later. When the pressure reducing valve 12 is not operated, or when the pressure reducing valve 12 is not provided, the total fuel-supply quantity corresponds to a pumping quantity of the fuel pump 11.

In step S24, the target fuel-supply quantity Ftrg set in step S22 is compared with the fuel-supply estimated quantity F obtained in step S23. When the computer determines that the target quantity Ftrg is greater than the estimated quantity F, the procedure proceeds to step S25 in which fuel discharge quantity of the fuel pump 11 is increased. Specifically, a difference between the estimated quantity F and the target quantity Ftrg is computed. According to this difference, the driving electric current applied to the SCV 11c is adjusted so that the estimated quantity F comes close to the target quantity Ftrg by feedback control (for example, PID control).

When the computer determines that the estimated quantity F is greater than the target quantity Ftrg, the procedure proceeds to step S26 in which the pressure reducing valve 12b is operated to reduce the pressure in the common-rail 12 so that the inlet pressure of the injectors 20 are decreased. Alternatively, the injector 20 performs no-injection operation to reduce the inlet pressure.

Specifically, a difference between the estimated quantity F and the target quantity Ftrg is computed. According to this difference, the operation period of the pressure reducing valve 12b or the no-injection operation period is adjusted so that the estimated quantity F comes close to the target quantity Ftrg by feedback control (for example, PID control). When the computer determines that the estimated quantity F is equal to the target quantity Ftrg, the procedure is terminated.

Figure 5:
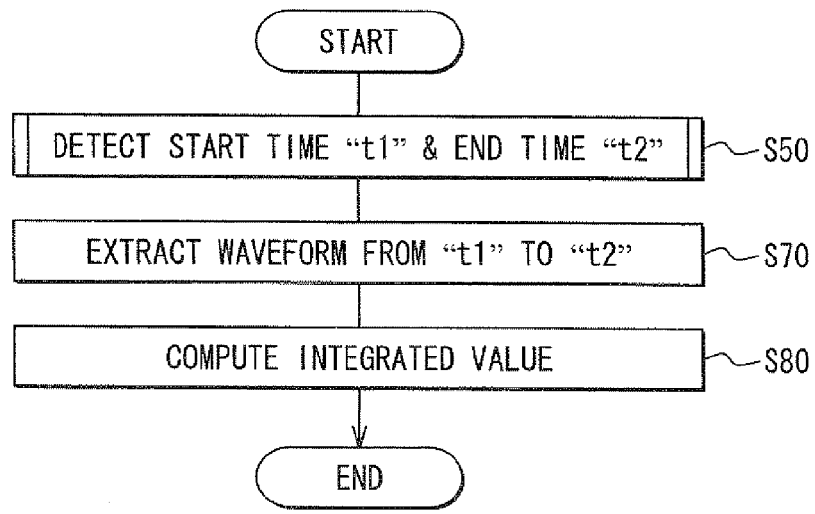
FIG. 5 is a flowchart showing a procedure of a fuel-supply quantity estimation according to the first embodiment.
Figure 6:
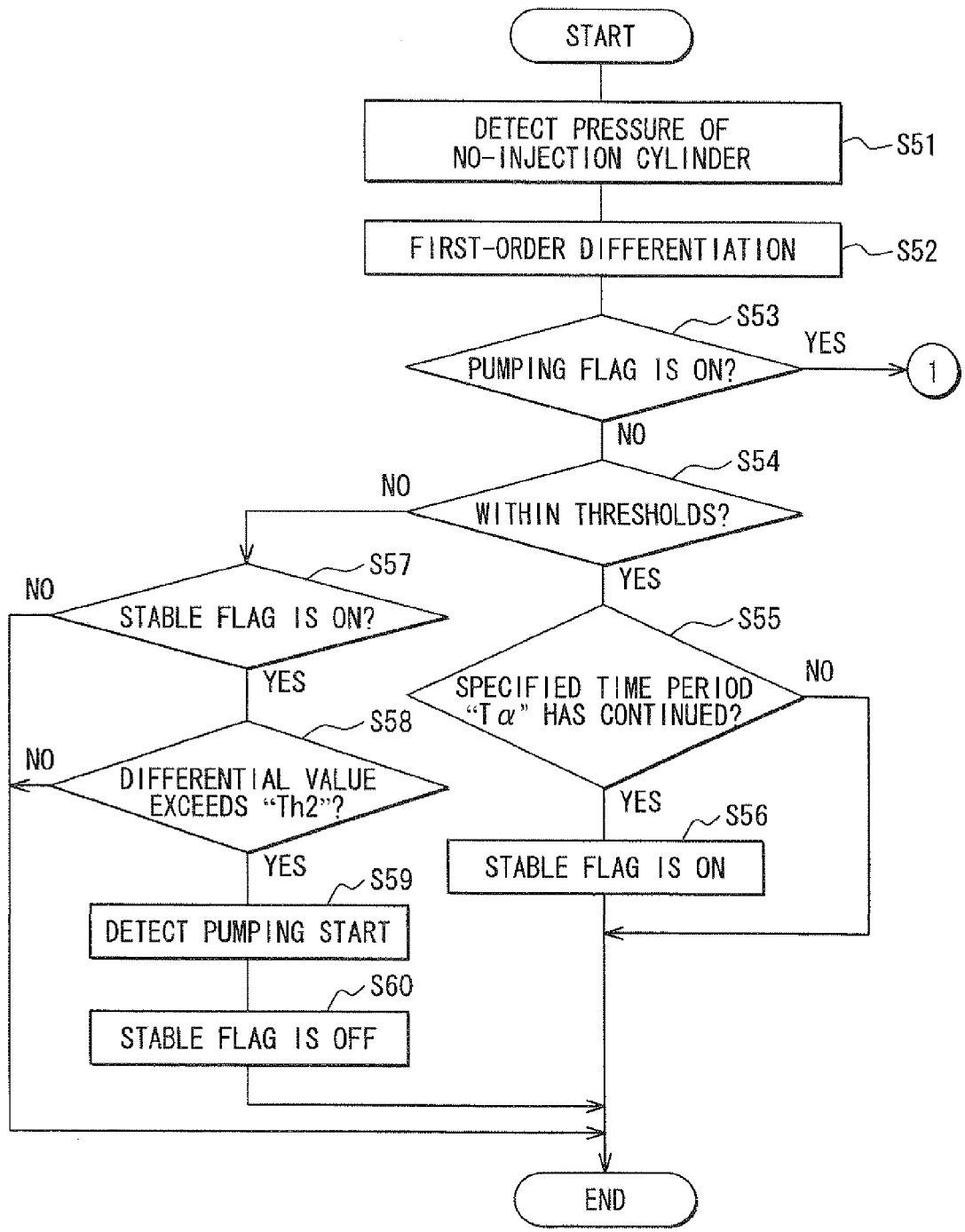
FIG. 6 is a flowchart showing a sub-routine of the flowchart shown in FIG. 5.
Figure 7:
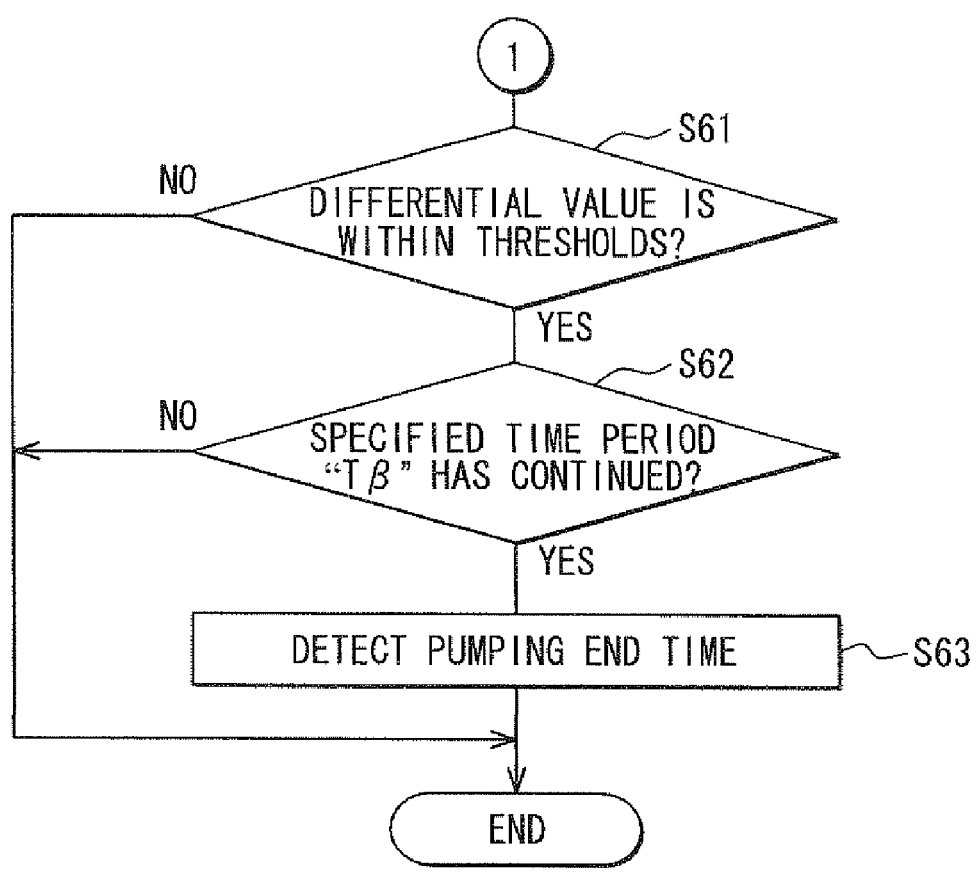
FIG. 7 is a flowchart showing a sub-routine of the flowchart shown in FIG. 5.

The processings shown in FIGS. 5 to 7 are performed at a specified cycle (for example, a computation cycle of the CPU) or at a every specified crank angle in order to compute the estimated quantity F. In the processes shown in FIGS. 5 to 7, the estimated quantity F is computed based on the inlet fuel pressure detected by the fuel pressure sensor 20a provided to the cylinder where no fuel injection is currently performed. The variation of the inlet fuel pressure of no-injection cylinder is indicated by a solid line L3 in FIG. 8D. The processes shown in FIGS. 5 to 7 can be performed with respect to each of fuel pressure sensors 20a. Alternatively, the processes can be performed with respect to only a selected fuel pressure sensor 20a.

Figure 8A:
FIGS. 8A to 8E are time charts showing a transition in an inlet pressure detected by a fuel pressure sensor.
Figure 8B:
Figure 8C:
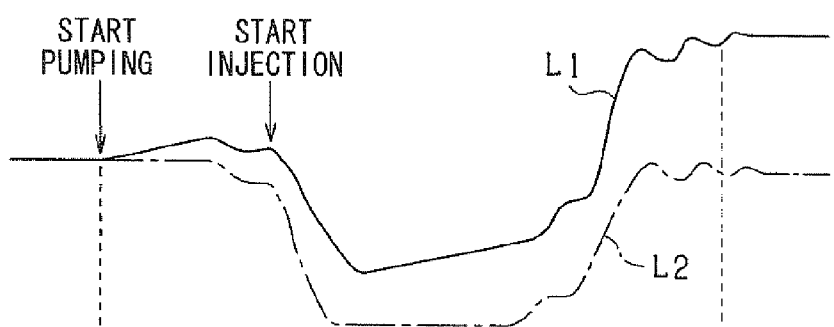
Figure 8D:
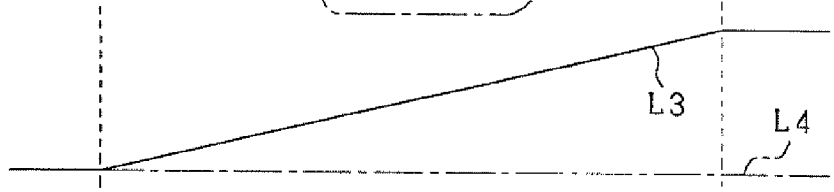
Figure 8E:
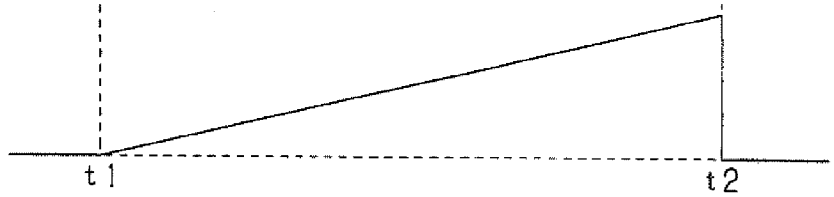

Referring to FIGS. 8A to 8E, variation waveforms used for above computation will be described in detail. FIG. 8A shows a transition of the injection command signal to the injector 20. FIG. 8B shows a transition of the injection rate. FIG. 8C shows a transition of the pressure of the injection cylinder, which is detected by the pressure sensor 20a. FIG. 8D shows a transition of the pressure of the non-injection cylinder. FIG. 8E shows a pressure value corresponding to the pressure variation component caused by the pumping of the fuel pump.

The pressure waveforms shown by dashed lines L2 and L4 in FIGS. 8C and 8D show the transition of the fuel pressure when the pressure variation component caused by the pumping does not have an effect (pressure variation component caused by the pumping is zero). A variation waveform shown by a solid line L1 in FIG. 8C is a waveform in a situation where the fuel injection by the injector 20 and the fuel pumping by the fuel pump 11 are concurrently performed. The waveform shown by the line L1 is obtained by synthesizing the waveform shown by the line L2, which is a reducing component of the detected pressure due to the fuel injection, and an increasing component of the detected pressure due to the pumping. The increasing component increases along with the pressure variation component caused by the pumping.

Figure 9A:
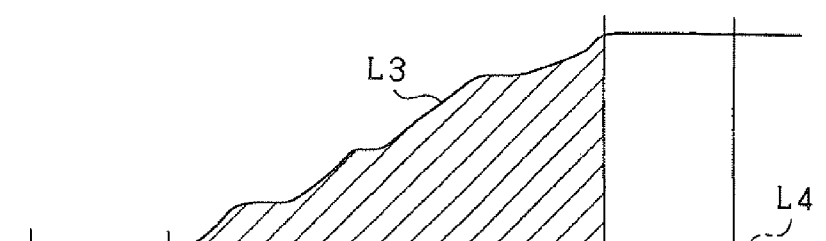
FIGS. 9A and 9B are time charts for explaining the inlet pressure shown in FIG. 8D in detail.

The waveform shown by the line L3 in FIG. 8D is the waveform in a situation where the injector 20 currently performs no injection. Thus, this waveform indicates only an increasing component which is generated by the pumping of the fuel pump. FIG. 9A shows the waveform L3 in detail, During a fuel pumping period T, the detected pressure increases, Before and after the fuel pumping period T, the detected pressure is stable at substantially constant values.

The variation in the fuel injection rate shown in FIG. 8B is estimated based on the variation waveforms L1, L2 shown in FIG. 8C. The estimated fuel injection rate is used for updating the injection control map which is used in step S11. Since the waveforms L1, L2 and the variation in the fuel injection rate has a relationship described below, the injection rate can be estimated.

FIG. 5 is a flowchart showing a fuel-supply quantity estimation process by use of the waveform L3. In step S50, the computer detects a start time t1 and an end time t2 of the fuel pumping period T. These detection processings are performed by subroutines shown in FIGS. 6 and 7.

In step S70, the computer extracts a part of waveform L3, which corresponds to a waveform from the start time t1 to the end time t2. The waveform L3 is drawn by use of the fuel pressure which is detected at a small interval (for example, 20 μsec) in step S51 of FIG. 6.

In FIG. 9A, a solid line L5 is a virtual line which indicates a situation where the detected pressure is maintained at a stable pressure which is equal to the pressure before the fuel pumping period T. In step S80 (estimating means), an area surrounded by the extracted waveform and the virtual straight line L5 is computed, which is shaded in FIG. 9A. That is, the detected pressure is integrated from the start time t1 to the end time t2 with respect to the variation waveform L3.

The integration value computed in this way is equivalent to the fuel-supply estimated quantity F. If the variation waveform L3 is a waveform obtained in the condition that leak has not arisen in the fuel passage from the fuel pump 11 to the fuel pressure sensor 20a by the operation of the pressure reducing valve 12b, the estimated quantity F is equivalent to the pumping quantity of the fuel pump 11.

Next, referring to FIGS. 6 and 7, the subroutines for detecting the start time t1 and the end time t2 will be described.

In step S51 (waveform obtaining means), the computer obtains the pressure detected by the fuel pressure sensor 20a which is currently provided to the no-injection cylinder. This detected pressure corresponds to the variation waveform L3. The detected pressure is successively obtained at a short interval in such a manner that the variation waveform L3 can be drawn by the detected pressure. Specifically, the detected pressure is successively obtained at an interval shorter than 50 μsec (desirably 20 μsec). The subroutine is repeatedly performed at the above intervals.

Figure 9B:
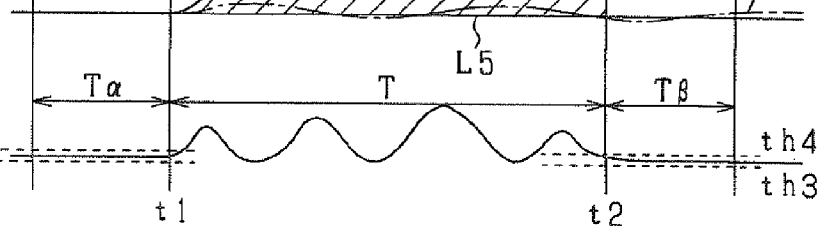

In step S52, the detected pressure obtained in step S51 is first-order differentiated. A solid line in FIG. 9B shows a variation in the first-order differential value. In step S53, the computer determines whether a pumping flag is ON, that is, whether it is in the fuel pumping period T. When the answer is NO in step S53, the procedure proceeds to steps S54 to S60 in which the start time t1 is detected. When the answer is YES in step S53, the procedure proceeds to steps S61 to S63 shown in FIG. 7 in order to detect the end time t2.

In step S54, the computer determines whether the differential value obtained in step S52 is within a range between thresholds th1 and th2 shown by dashed lines in FIG. 9B. When the answer is YES in step S54, the procedure proceeds to step S55 in which the computer determines whether such a condition has been continued for a specified time period Tα. When the condition where the differential value is within the range between the thresholds th1 and th2 has been continued for the specified time period Tα, the procedure proceeds to step S56 in which a stable flag is turned ON.

When the answer in NO in step S54, the procedure proceeds to step S57 in which the computer determines whether the stable flag is ON. When the answer is YES in step S57, the procedure proceeds to step S58 (pressure increase detecting means) in which the computer determines whether the differential value exceeds a first threshold. The first threshold is needed to be set to a value which is greater than or equal to the threshold th2. In this embodiment, the first threshold is set to the threshold th2. When the computer determines that the differential value exceeds the first threshold in step S58, the procedure proceeds to step S59 (pressure increase detecting means) in which the fuel pump starts pumping and the computer detects the pumping start time t1.

When the answer is YES in step 353, the procedure proceeds to step S61 in FIG. 7. In step S61 (end detecting means), the computer determines whether the differential value obtained in step S52 is within a range of thresholds th3 and th4 shown by dashed lines in FIG. 9B. When the answer is YES in step S61, the procedure proceeds to step S62 in which the computer determines whether such a condition has continued for a specified time period Tβ.

When the condition where the differential value is within the range between the thresholds th3 and th4 has been continued for the specified time period Tβ, the procedure proceeds to step S63 (end detecting means). In step S63, the computer detects a varying point of the differential value before the specified period Tβ and defines the varying point as the pumping end time t2. At the varying point of the differential value, the differential value is less than the second threshold. In this embodiment, the second threshold is set to the threshold th4. In step S63, the pumping end is detected and the pumping flag is turned OFF.

According to the embodiment described above, following advantages can be obtained.

(1) The detected pressure is successively obtained at a short interval (desirably 20 μsec) in such a manner that the variation waveform L3 can be drawn by the detected pressure (S51). The detected pressure is integrated from the pumping start time t1 to the pumping end time t2 with respect to the variation waveform L3. The integrated value corresponds to the fuel-supply estimated quantity F (S80). Since the fuel pump 11, the injector 20 and the pressure reducing valve 12b are feedback controlled so that the estimated quantity F comes close to the target quantity Ftrg, the fuel-supply quantity to the injector 20 can be accurately controlled.

(2) Since the variation waveform L3 is used for estimating the fuel quantity, the fuel-supply quantity can be accurately estimated, compared with the case where the variation waveform L1 is used. That is, in a case that the fuel quantity is estimated by use of the waveform L1, it is necessary that the variation waveform L2 is subtracted from the variation waveform L1 to extract a pressure-increasing waveform component, and the detected pressure is integrated to obtain the fuel-supply estimated quantity F with respect to the extracted waveform. On the other hand, since the variation waveform L3 does not include a pressure-reducing component caused by the fuel injection, it is unnecessary to subtract the variation waveform L4 from the variation waveform L3. Therefore, the fuel-supply quantity can be estimated accurately.

(3) In a case that the engine has only one cylinder, the variation waveform L3 is obtained from an outputs of a single fuel pressure sensor 20a. The fuel-supply estimated quantity F can no be obtained during the fuel injection. On the other hand, in this embodiment, since the variation waveform L3 is obtained from outputs of a plurality of fuel pressure sensor 20a, the estimated quantity F can be computed continuously.

(4) In order to integrate the detected value with respect to the variation waveform L3, it is necessary to detect the pumping start time t1 and the pumping end time t2. In this embodiment, the variation point where the differential value of the detected pressure exceeds the first threshold th2 is defined as the pumping start time t1, and the variation point where the differential value of the detected pressure becomes less than the second threshold th2 is defined as the pumping end time t2. Therefore, the pumping start time t1 and the pumping end time t2 can be easily detected.

Furthermore, the pumping start time t1 is detected under a condition that the differential value of the detected pressure exceeds the first threshold immediately after the specified time period Tα has elapsed, in which the differential value is within the range between the thresholds th1 and th2. The pumping end time t2 is detected under a condition that the differential value of the detected pressure becomes less than the second threshold right before the specified time period Tβ has elapsed, in which the differential value is within the range between the thresholds th3 and the4. Therefore, a mere pulsation in the variation waveform L3 is not detected as the variation point. The pumping start time t1 and the pumping end time t2 are accurately detected so that the fuel-supply quantity can be estimated with high accuracy.

Second Embodiment

Figure 10:
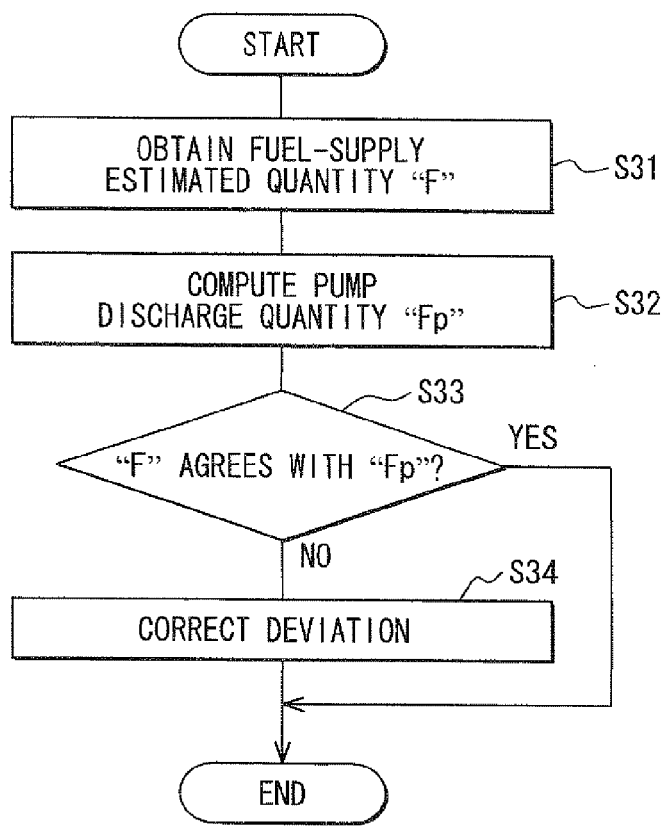
FIG. 10 is a flowchart showing a correction operation of a pump control according to a second embodiment.

In addition to the processings shown in FIGS. 3 to 7, a correction process of the pump control shown in FIG. 10 is performed. The processing shown in FIG. 10 is performed at a specified cycle (for example, a computation cycle of the CPU) or at a every specified crank angle. In step S31, the fuel-supply estimated quantity F is obtained, which is computed in step S80.

In step S32, a pump discharge quantity Fp from the outlet 11e of the high-pressure pump 11a is computed based on a driving condition of the fuel pump 11. For example, a fuel-supply quantity from the low-pressure pump 11b to the high-pressure pump 11a is computed based on a driving current supplied to the SCV 11c. The pump discharge quantity Fp is computed based on this fuel-supply quantity, a plunger speed of the high-pressure pump 11a and the like.

In step S33, the computer compares the estimated quantity F with the pump discharge quantity Fp to determine whether the estimated quantity F agrees with the pump discharge quantity Fp. When the answer is NO in step S34, the procedure proceeds to step S34 in which the difference between the quantity F and the quantity Fp is reflected to the fuel pump control. Specifically, the driving current supplied to the SCV 11c is corrected according to the difference. According to the above configuration, the fuel pump 11 is controlled according to the actual fuel-supply quantity, so that the pressure in the common-rail 12 is accurately controlled to be desired pressure.

Third Embodiment

Figure 11:
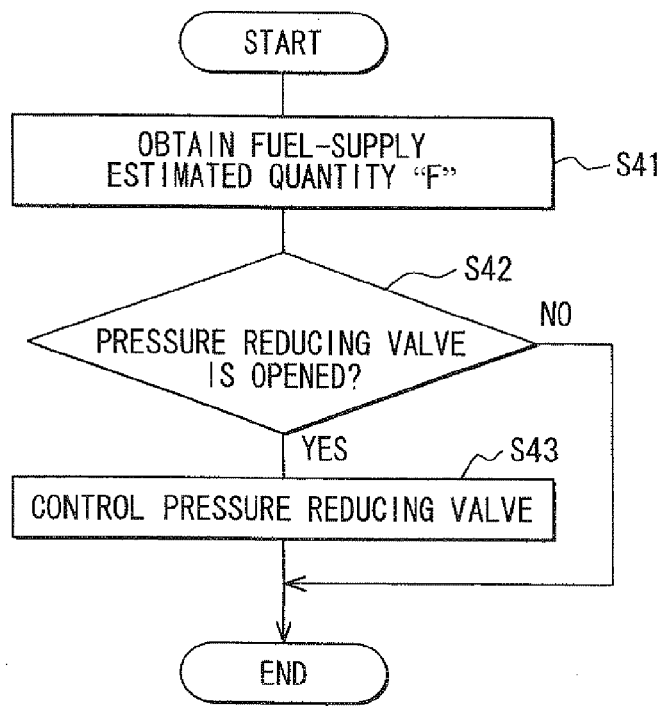
FIG. 11 is a flowchart showing a correction operation of a pressure reducing valve according to a third embodiment.
Figure 12A:
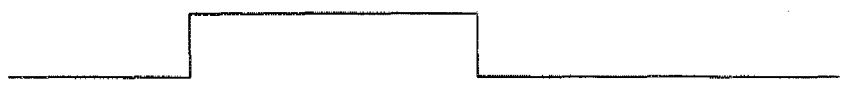
FIGS. 12A to 12E are time charts for explaining an advantage of a sixth embodiment.
Figure 12B:
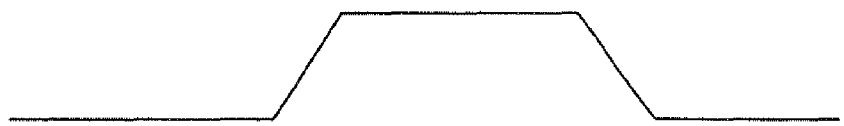
Figure 12C:
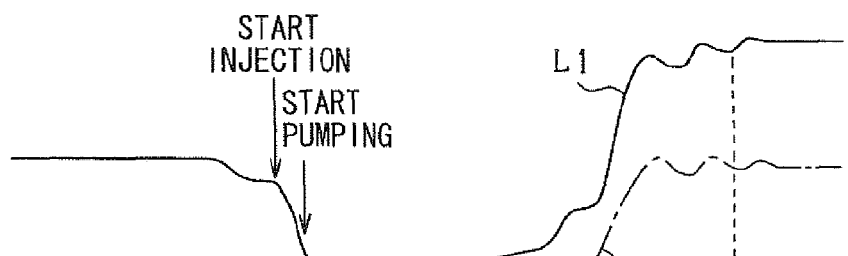
Figure 12D:
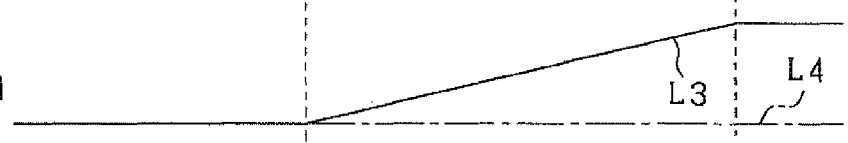
Figure 12E:
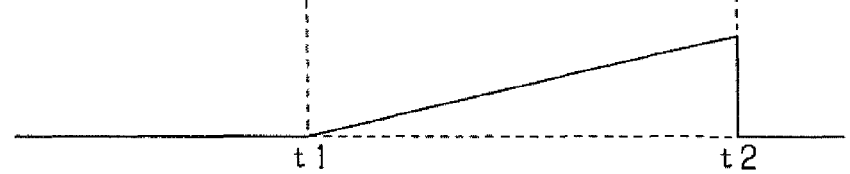

In addition to the processings shown in FIGS. 3 to 7, a correction process of the pressure reducing valve control shown in FIG. 11 is performed. The processing shown in FIG. 11 is performed at a specified cycle (for example, a computation cycle of the CPU) or at a every specified crank angle, In step S41, the fuel-supply estimated quantity F is obtained, which is computed in step S80.

In step S42, the computer determines whether the pressure reducing valve 12b is opened at the time of pumping the fuel. When the computer determines that the pressure reducing valve 12b is opened during the pumping (YES in step S42), the procedure proceeds to step S43 in which the pressure reducing valve 12b is controlled in consideration of the fuel-supply estimated quantity F. Specifically, a valve opening time of the pressure reducing valve 12b is corrected according to the estimate quantity F. According to the above configuration, the pressure reducing valve 12b is controlled according to the actual fuel-supply quantity, so that the pressure in the common-rail 12 is accurately controlled to be desired pressure.

Fourth Embodiment

In the above embodiment, the area surrounded by the variation waveform L3 and the virtual straight line L5 is computed by integration. In this embodiment, the variation waveform L4 shown in FIGS. 8 and 9 is stored as a prototype waveform. The area surrounded by the prototype waveform L4 and the variation waveform L3 is computed by integration, and the integrated value is set as the fuel-supply estimated quantity F. That is, the detected pressure is integrated from the start time t1 to the end time t2 with respect to the variation waveform in which the prototype waveform L4 is subtracted from the variation waveform L3. It is desirable that the prototype waveform L4 is stored with respect to various condition, such as the fuel pressure at the pumping start time t1.

As described above, the variation waveform L3 does not include a pressure-reducing component which is arisen due to the fuel injection. However, strictly speaking, the fuel pressure sensor 20a provided to the cylinder in which no fuel injection is currently performed receives some effects of the pressure-reducing from the other cylinders in which the fuel injection is performed. Thus, even in a case that no pumping effect exists, the fuel pressure is slightly varied as shown by the dashed line L4 in FIG. 9A.

On the other hand, according to this embodiment, since the area surrounded by the prototype waveform L4 and the variation waveform L3 is computed as the fuel-supply estimated quantity F, the pressure increasing component in the variation waveform L3 is accurately extracted to be integrated. Therefore, the accuracy of estimating the fuel-supply quantity can be improved.

Fifth Embodiment

The fuel-supply quantity can be estimated by use of the variation waveform L1.

Specifically, the variation waveform L2 shown in FIG. 8C is previously stored as a prototype waveform. The area surrounded by the prototype waveform L2 and the variation waveform L1 is computed by integration, and the integrated value is set as the fuel-supply estimated quantity F. That is, the detected pressure is integrated from the start time t1 to the end time t2 with respect to the variation waveform in which the prototype waveform L2 is subtracted from the variation waveform L1.

Sixth Embodiment

In the first embodiment, the pumping start time t1 is detected based on whether the first-order differential value of the detected pressure exceeds the first threshold th2. In this embodiment, the variation waveforms L2 and L4 (refer to FIGS. 8 and 9) are previously stored as the prototype waveforms. The pumping start time t1 is detected based on whether the detected pressure obtained in step S51 exceeds the prototype waveforms L2, L4 by a specified quantity. The pumping end time t2 is detected based on whether the detected pressure obtained in step S51 agrees with the prototype waveforms L2, L4, or whether the detected pressure comes close to the prototype waveforms L2 L4 within a specified pressure range.

In the embodiment shown in FIGS. 8A to 8E, since the fuel injection is started after the fuel pumping by the fuel pump, the pumping start time t1 can be detected by detecting a variation point indicative of the increase in detected pressure in the variation waveform L1. That is, the pumping start time t1 can be detected based on whether the first-order differential value of the detected pressure exceeds the first threshold th2.

On the other hand, in the example shown in FIG. 12, since fuel injection is started before the fuel pumping, the rise of the detected pressure due to the fuel pumping does not appear in the variation waveform L1. Thus, it is difficult to detect the pumping start time t1 according to the detecting way of the first embodiment. According to the present embodiment, since the pumping start time t1 is detected based on whether the detected pressure obtained in step S51 exceeds the prototype waveform L2, the pumping start time t1 can be accurately detected also in the example shown in FIG. 12, Other Embodiment The above-mentioned embodiments may be modified as follows. The present invention is not limited to the above described embodiment.

In the above embodiments, the variation in the detected pressure during the fuel pumping period T, that is, the variation waveform L3 is detected by obtaining a plurality of detected pressure. The variation waveform L3 can be obtained by detecting the fuel pressure at the pumping stat time t1 and the pumping end time t2. It is unnecessary to detect the fuel pressure during the fuel pumping period T. The variation waveform L3 can be deemed as a linear waveform by which the fuel-supply quantity can be estimated.

The target fuel injection quantity, which is injected through the injector 20, may be varied according to the fuel-supply estimated quantity F. For example, the difference between the target fuel-supply quantity Ftrg and the fuel-supply estimated quantity F is computed, and the target fuel injection quantity can be set according to the difference.

A piezo-electrically driven injector may be used in place of the electromagnetically driven injector shown in FIG. 2. A fuel injector not causing a pressure leak through the leak hole 24, for example, a direct-acting injector not using the oil pressure chamber Cd so as to transmit a driving power (for example, direct-acting piezoelectric injector that has been developed in recent years) can be also used. When the direct-acting injector is used, the injection rate can be easily controlled.

The fuel pressure sensor can be arranged in the housing 20e as indicated by a dashed line with reference numeral 200a in FIG. 2. The fuel pressure in the fuel passage 25 can be detected by the pressure sensor 200a.

In a case that the fuel pressure sensor 20a is arranged close to the fuel inlet 22, the fuel pressure sensor 20a is easily mounted. In a case that the fuel pressure sensor 200a is arranged in the housing 20e, since the fuel pressure sensor is close to the fuel injection port 20f, the variation in pressure at the fuel injection port 20f can be accurately detected.

The fuel pressure sensor 20a can be provided in the high pressure piping 14. In this case, the fuel pressure sensor 20a is apart from the common-rail 12 by a specified distance.

Moreover, between the common-rail 12 and the high pressure piping 14, there is provided a flow rate restricting means which restricts flow rate of the fuel which flows into the high pressure piping 14 from the common-rail 12. If an excessive fuel flows out due to a damage of the high pressure piping 14 or the injector 20, the flow rate restricting means closes the passage. The flow rate restricting means includes a ball valve which closes the passage when the excessive fuel flows out. A flow damper having the orifice 12*a* and the flow rate restricting means can be employed.

The fuel pressure sensor 20*a* is provided downstream of the orifice and the flow rate restricting means. Alternatively, the fuel pressure sensor 20*a* can be provided downstream of one of the orifice and the flow rate restricting means.

The number of the fuel pressure sensors 20*a* may be determined arbitrarily, and for example, two or more fuel pressure sensors may be disposed for the fuel passage of one cylinder. In the above-mentioned embodiments, the fuel pressure sensor 20*a* is disposed for each cylinder. However, the fuel pressure sensor can be disposed only for a part of the cylinders (for example, one cylinder), and the estimated value based on the output of the sensor may be used for the other cylinders A rail pressure sensor detecting a pressure in the common-rail 12 can be further provided. With this, the fuel pressure can be detected more accurately. The rail pressure sensor can be used instead of the fuel pressure sensor 20*a*. The variation waveforms can be obtained from the fuel pressure detected by the rail pressure sensor.

The kind of the engine to be controlled and the construction of the system can be changed as appropriate according to the use or the like. The present invention can be applied, for example, also to a gasoline engine of a spark ignition type (in particular, direct injection type engine) in the same way. The fuel injection system of a direct injection type gasoline engine is provided with a delivery pipe for storing fuel (gasoline) in a high-pressure state. The fuel is pressure-fed to this delivery pipe from the fuel pump, and the high-pressure fuel in the delivery pipe is delivered to a plurality of the injector 20 and is injected to the combustion chamber of the engine. In this system, the delivery pipe corresponds to an accumulation container. The apparatus and the system according to the present invention can be used for the controlling of the fuel injection pressure of not only the fuel injector for directly injecting the fuel into the cylinder but also the fuel injector for injecting the fuel into an intake passage or an exhaust passage of the engine.

What is claimed is:

1. A fuel-supply quantity estimating apparatus applied to a fuel injection system including a multi-cylinder internal combustion engine, a fuel pump, a plurality of fuel injectors respectively provided to each cylinder, and a fuel pressure sensor detecting pressure of fuel supplied to the fuel injector, the fuel-supply quantity estimating apparatus comprising:
   a waveform obtaining unit for obtaining a variation waveform of the pressure detected by the fuel pressure sensor; and
   an estimating unit for estimating a quantity of fuel supplied to the fuel injector based on a waveform of the detected pressure that is greater than a reference value due to a fuel pumping, in the variation waveform obtained by the waveform obtaining unit, wherein
   the fuel pressure sensor is provided to each of the fuel injectors, and
   the estimating unit performs the estimation based on an output of the fuel pressure sensor provided to the cylinder in which no fuel injection is currently performed.

2. A fuel-supply quantity estimating apparatus applied to a fuel injection system including a fuel pump, a fuel injector, and a fuel pressure sensor detecting pressure of fuel supplied to the fuel injector, the fuel-supply quantity estimating apparatus comprising:
   a waveform obtaining unit for obtaining a variation waveform of the pressure detected by the fuel pressure sensor;
   an estimating unit for estimating a quantity of fuel supplied to the fuel injector based on a waveform of the detected pressure that is greater than a reference value due to a fuel pumping, in the variation waveform obtained by the waveform obtaining unit, wherein the estimating unit estimates the quantity of the fuel based on the waveform which is obtained when no fuel is injected from the fuel injector; and
   a pressure increase detecting unit for detecting a first variation point where a first-order differential value of the detected pressure exceeds a first threshold as a pressure increasing start time of the detected pressure due to the fuel pumping, wherein
   the waveform after the first variation point in the variation waveform is used for estimating the quantity of the fuel supplied to the fuel injector.

3. A fuel-supply quantity estimating apparatus according to claim 2, wherein
   the pressure increase detecting unit detects the variation point which appears immediately after a specified time period has elapsed in which a variation width of the detected pressure is less than or equal to a specified value as the pressure increasing start time.

4. A fuel-supply quantity estimating apparatus applied to a fuel injection system including a fuel pump, a fuel injector, and a fuel pressure sensor detecting pressure of fuel supplied to the fuel injector, the fuel-supply quantity estimating apparatus comprising:
   a waveform obtaining unit for obtaining a variation waveform of the pressure detected by the fuel pressure sensor;
   an estimating unit for estimating a quantity of fuel supplied to the fuel injector based on a waveform of the detected pressure that is greater than a reference value due to a fuel pumping, in the variation waveform obtained by the waveform obtaining unit, wherein the estimating unit estimates the quantity of the fuel based on the waveform which is obtained when no fuel is injected from the fuel injector; and
   an end detecting unit for detecting a second variation point where a first-order differential value of the detected pressure is less than a second threshold as an end time of the pressure increasing of the detected pressure due to the fuel pumping, wherein
   the waveform before the second variation point in the variation waveform is used for estimating the quantity of the fuel supplied to the fuel injector.

5. A fuel-supply quantity estimating apparatus according to claim 4, wherein
   the end detecting unit detects the variation point which appears right before a specified time period continues in which a variation width of the detected pressure is less than or equal to a specified value as the pressure increasing end time.

6. A fuel-supply quantity estimating apparatus applied to a fuel injection system including a fuel pump, a fuel injector, and a fuel pressure sensor detecting pressure of fuel supplied to the fuel injector, the fuel-supply quantity estimating apparatus comprising:

- a waveform obtaining unit for obtaining a variation waveform of the pressure detected by the fuel pressure sensor; and
- an estimating unit for estimating a quantity of fuel supplied to the fuel injector based on a waveform of the detected pressure that is greater than a reference value due to a fuel pumping, in the variation waveform obtained by the waveform obtaining unit; wherein
- when no fuel is pumped from the fuel pump, the variation waveform is previously stored as a prototype waveform which is the reference value, and
- a waveform deviating from the prototype waveform in the variation waveform is used for estimating the quantity of the fuel supplied to the fuel injector.

7. A fuel-supply quantity estimating apparatus applied to a fuel injection system including a fuel pump, a fuel injector, and a fuel pressure sensor detecting pressure of fuel supplied to the fuel injector, the fuel-supply quantity estimating apparatus comprising:

- a waveform obtaining unit for obtaining a variation waveform of the pressure detected by the fuel pressure sensor; and
- an estimating unit for estimating a quantity of fuel supplied to the fuel injector based on a waveform of the detected pressure that is greater than a reference value due to a fuel pumping, in the variation waveform obtained by the waveform obtaining unit; wherein
- when no fuel is pumped from the fuel pump, the variation waveform is previously stored as a prototype waveform which is the reference value, and
- the estimating unit computes an area which is obtained by subtracting the prototype waveform from the variation waveform, and estimates that the area corresponds to the quantity of fuel supplied to the fuel injector.

* * * * *